No. 674,439. Patented May 21, 1901.
J. J. FOY.
WATER SEAL OR TRAP.
(Application filed Dec. 30, 1899.)
(No Model.)
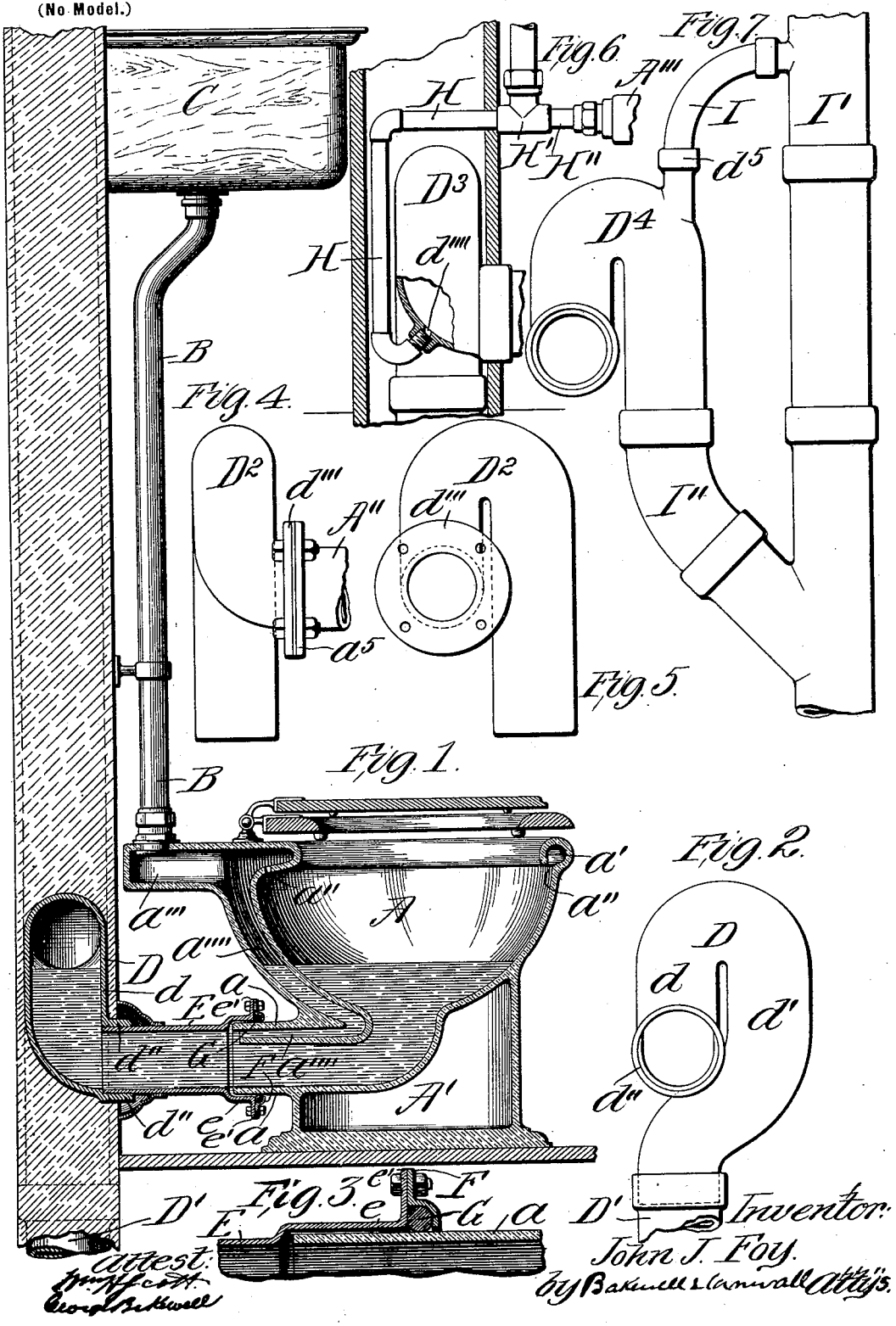
Inventor
John J. Foy.
by Bakewell & Cornwall Attys.

UNITED STATES PATENT OFFICE.

JOHN J. FOY, OF ST. LOUIS, MISSOURI, ASSIGNOR OF ONE-HALF TO EDWARD H. JOYCE, OF SAME PLACE.

WATER SEAL OR TRAP.

SPECIFICATION forming part of Letters Patent No. 674,439, dated May 21, 1901.

Application filed December 30, 1899. Serial No. 742,111. (No model.)

*To all whom it may concern:*

Be it known that I, JOHN J. FOY, a citizen of the United States, residing at the city of St. Louis, State of Missouri, have invented a certain new and useful Improvement in Water Seals or Traps, of which the following is a full, clear, and exact description, such as will enable others skilled in the art to which it appertains to make and use the same, reference being had to the accompanying drawings, forming part of this specification.

This invention relates to a new and useful improvement in traps which are used to prevent gases or obnoxious vapors escaping from sewers and the like into the building in which said trap is located.

In the accompanying drawings I have illustrated my improved trap in connection with a water-closet, although, obviously, the same can be applied equally as well to sinks, bath-tubs, washbasins, and all devices wherein traps are employed.

The object of this invention is to provide a trap which will have its joints "water-sealed" or located below the water-level of the two legs of the trap and by which construction gases or obnoxious vapors are prevented from escaping through said joints.

I attain the above object by the mechanism illustrated in the accompanying drawings, in which—

Figure 1 is a vertical sectional view through a water-closet and a wall or partition adjacent thereto and in connection with which is illustrated my improved trap. Fig. 2 is a detail view, in front elevation, of a fitting which forms one member of my improved trap, a short section of the soil-pipe being shown in connection therewith. Fig. 3 is an enlarged detail sectional view of a portion of one form of coupling employed in carrying out my invention. Fig. 4 is a side elevational view of a slightly-modified form of the fitting which forms one member of my improved trap, together with a short section of a water-closet bowl secured thereto. Fig. 5 is a front elevational view of the modified fitting illustrated in Fig. 4. Fig. 6 is a detail side elevational view, partly in section, of a modified form of fitting employed in carrying out my invention, the same being illustrated in connection with a wall or partition and equipped with a modified form of siphoning device; and Fig. 7 is a front elevational view of a modified form of fitting employed in carrying out my invention, the same being illustrated in connection with the soil-pipe and vent-pipe.

The usual construction of trap for water-closets is to form the trap and bowl integral and then form a joint for the trap and soil-pipe at about the floor-line by a suitable calked bell or flange joint. This joint being below or away from the water in the trap frequently becomes loose, either by expansion or contraction, drying out of the calking material, or by corrosion or disintegration, and permits sewer-gases, &c., to enter the room. This objection is entirely removed by the use of my improved trap, as will presently be explained.

In the accompanying drawings, wherein similar characters designate similar parts throughout the several views, A represents a water-closet bowl formed integral with the base A' and provided with a cylindrical exit-neck $a$, which leads from the bottom of bowl A and extends rearwardly at right angles therefrom a short distance.

$a'$ represents the hollow bead or flange, which is arranged around the top of the bowl A and communicates therewith through a small slot $a''$, the purpose of which is to wash or flush the inner face of the bowl, as is usual in devices of this character.

$a'''$ represents a hollow flanged portion which extends rearwardly from the upper portion of bowl A, which hollow portion opens into the hollow bead or flange $a'$. Leading from this hollow flanged portion $a'''$ and extending downwardly and preferably following the contour of the bowl for a suitable distance is a passage-way $a''''$, which passage-way makes a suitable bend and by preferably a somewhat reduced area enters and runs approximately parallel with the upper edge of the exit-neck $a$. Opening into the hollow flanged portion $a'''$ and secured thereto by a suitable coupling is the ordinary flushing-pipe B, whose upper end communicates with and is secured to the ordinary reservoir C.

D represents a fitting made, preferably, of cast metal, which forms one member of a trap, the same being illustrated in the drawings as embedded or located in the wall of a building and is best illustrated in Figs. 1 and 2, wherein it will be seen to consist of practically an inverted-U-shaped cylindrical pipe whose vertical or approximately parallel members $d$ and $d'$ are of unequal lengths, the former, ($d$,) which is the shorter, being formed with a bent portion arranged about ninety degrees relative to the axis of said shorter member $d$, the same being provided with a bell portion $d''$, designed to receive a suitable section of pipe. The longer member $d'$ of this fitting D is caused to communicate with and be secured in any suitable manner to the soil-pipe D', which is, like the fitting D, preferably located within the wall of the building.

E represents a pipe, one end of which is received in the bell portion $d''$ of the fitting D, said fitting being preferably formed by calking the joint with lead in the usual manner, and the other end is formed with a suitable bell portion $e$, which is caused to telescope the end of the portion $a$ of the bowl A. This bell portion $e$ is provided upon its outer edge with a flange $e'$, and bolted thereto is a ring F, said ring F being formed with an inwardly-opening concavity and in which and resting against the flange $e'$ is secured a rubber or other suitable packing-ring G. The internal diameter of the bell portion $e$ is designed to be larger than the portion $a$, which it telescopes, the purpose of which is to allow for expansion and contraction of the parts or irregularities, the joint, however, being kept perfectly tight by the packing G, which snugly fits the parts, as will be readily understood by a glance at Figs. 1 and 3 of the drawings.

In assembling the joint there is preferably a small space left between the flange $e'$ and the ring F, whereby the parts may be adjusted—that is, the packing-ring expands by turning the nuts and drawing the ring F closer to the flange $e'$.

From the above description it will be seen that the trap proper is formed by the union of the bowl A, the fitting D, and the pipe E and that all joints of this trap are formed below the water-level, thus preventing the escape of sewer-gas, &c., through said joints into the room. I may term this construction a "sectional" trap in that the trap, which is U-shaped, has one of its vertical or parallel members formed by the shorter member $d$ of the fitting D; its other member by the bowl A, and its connecting or loop portion by the pipe E.

The operation of a closet of this description is so well known that other than a terse description will not be given. When the valve in the reservoir C is opened, the water contained therein runs down through the pipe B into the hollow portion $a'''$ of the bowl, where it then divides, part of which rushes into the hollow bead $a'$, which surrounds the upper portion of the bowl, and out and down through the small slot $a''$, washing the inner face of bowl A; but the greater part of said water rushes down through the passage $a''''$ into and through the pipe E and starts or assists in starting the siphoning action of the closet in the usual manner.

In Figs. 4 and 5 I have illustrated a slightly-modified form of fitting, which is lettered $D^2$, the same being designed for use in connection with either a metallic bowl A'' or the pipe E, said fitting having a flange $d'''$ formed on the shorter member, which is designed to be bolted to a corresponding flange $a^5$, formed on either the bowl A'' or the pipe E, as the case may be.

In Fig. 6 I have illustrated a modified form of a siphon-starting device, which consists in forming an opening $d''''$ in the lower or bent portion of the shorter member of the fitting $D^3$, and connecting with said fitting and in registration with said opening $d''''$ is a pipe H, the upper end of which is secured in a T-joint H'. H'' represents another short section of pipe which connects the T-joint with the closet A''', and in the other member of said T-joint is arranged the ordinary flushing-pipe. By this construction it will be seen that the water which passes down through the flushing-pipe is divided, part going to the closet and part through the pipe H into the shorter member of the fitting $D^3$.

Fig. 7 illustrates a slightly-modified form of fitting $D^4$, which is provided with a bell portion $d^5$, designed to receive a vent-pipe I, which vent-pipe is connected to the main pipe I' and is designed to prevent siphoning in what is termed "wash-out" closets. I'' represents the soil-pipe, one end of which is attached to the fitting $D^4$, while its other end is attached to the main pipe I'.

I am aware that minor changes in the construction, arrangement, and combination of several parts of my device may be made and substituted for those herein shown and described without in the least departing from the nature and principle of my invention.

Having thus described my invention, what I claim, and desire to secure by Letters Patent, is—

1. A single-piece inverted-U-shaped fitting, one of the legs of which is longer than and depends below the other leg, the shorter leg of said fitting having a laterally-projecting coupling portion extending substantially at right angles to a vertical plane passing through both legs of said fitting, substantially as and for the purpose described.

2. The combination with a bowl having a lateral exit-neck and a substantially vertical soil-pipe, of a single-piece inverted-U-shaped fitting, one of the legs of which is longer than and depends below the other leg, the shorter leg of said fitting having a laterally-projecting coupling portion extending substantially at right angles to a vertical plane passing through both legs of said fitting, said laterally-projecting portion being substantially in line with and coupled to said exit-neck, said longer leg depending substantially vertically into said soil-pipe, substantially as described.

In testimony whereof I hereunto affix my signature, in the presence of two witnesses, this 22d day of December, 1899.

JOHN J. FOY.

Witnesses:
WM. H. SCOTT,
GEORGE BAKEWELL.